United States Patent
Black et al.

(10) Patent No.: US 6,754,833 B1
(45) Date of Patent: Jun. 22, 2004

(54) METHOD FOR GENERATING AND DISTRIBUTING TELECOM AND INTERNET REVENUE

(75) Inventors: Alan J. Black, Cupertino, CA (US); Alain S. Rossmann, Palo Alto, CA (US); Christophe Francois, Neuilly sur Seine (FR)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/408,278

(22) Filed: Sep. 29, 1999

Related U.S. Application Data

(63) Continuation-in-part of application No. 08/987,346, filed on Dec. 9, 1997, now Pat. No. 6,065,120.

(51) Int. Cl.[7] .................................................. G06F 1/24
(52) U.S. Cl. ........................ 713/201; 713/169; 713/182; 713/183
(58) Field of Search ................................ 713/169, 182, 713/183, 184, 202

(56) References Cited

U.S. PATENT DOCUMENTS

| | | |
|---|---|---|
| 5,815,665 A | 9/1998 | Teper et al. |
| 5,825,759 A | 10/1998 | Liu |
| 5,884,312 A | 3/1999 | Dustan et al. |
| 5,905,251 A | 5/1999 | Knowles |
| 5,907,547 A | 5/1999 | Foladare et al. |

FOREIGN PATENT DOCUMENTS

| | | |
|---|---|---|
| EP | 0890907 A1 | 1/1999 |
| EP | 0891062 A2 | 1/1999 |
| WO | WO 99/07108 A2 | 2/1999 |
| WO | WO 99/44146 A1 | 9/1999 |

*Primary Examiner*—Thomas R. Peeso
(74) *Attorney, Agent, or Firm*—Blakely, Sokoloff, Taylor & Zafman LLP

(57) ABSTRACT

The present invention is directed to a business model and method for generating and distributing Telecom and Internet revenue between a wireless network operator and an Internet Partner company. The inventive business model provides an Internet web-site for the carrier's subscribers, with the web-site being developed by the Internet Partner. The web-site features applications and services tailored to the subscribers in their role as users of a mobile wireless communications device. The invention provides incentives to increase network usage and conduct transactions that generate value for both the wireless network operator and the Internet Partner.

33 Claims, 4 Drawing Sheets

METHOD FOR GENERATING AND DISTRIBUTING TELECOM AND INTERNET REVENUE

RELATED APPLICATION(S)

This is a continuation-in-part application of allowed U.S. patent application Ser. No., 08/987,346, entitled "Method and System for Self-Provisioning a Rendezvous to Ensure Secure Access to Information Access to Information in a Database from Multiple Devices", filed Dec. 9, 1997 now U.S. Pat. No. 6,065,120, assigned to the assignee of the present invention, and the contents of which are hereby incorporated by reference.

BACKGROUND OF THE INVENTION

1. Field of Invention

This invention relates to methods for generating and/or distributing revenue when a user accesses a web portal or web-site. More specifically, the invention is directed to a business model and method for generating and distributing the Telecom and Internet revenue produced when a subscriber of a wireless carrier accesses a group of specialized services and applications through a web-site. The web-site carries the brand characteristics of the carrier, but is typically established by a separate entity.

2. Description of the Related Art

Two-way interactive mobile communication devices are among the fastest emerging communication devices. Such devices enable users to receive, collect, analyze, review and disseminate information as they travel or move about. The newer mobile devices combine voice, data, and personal digital assistant (PDA) functions into a single portable device that enables a user to place phone calls as well as access a myriad of public and enterprise information services from a business network or the Internet. These services or applications may be accessed through the mobile devices from anywhere at anytime, permitting a user to have enormous flexibility with regards to how and when they use the information available. This frees the user from the need to be physically co-located with the source of information or to have access to the more traditional means of accessing such information, e.g., a desktop or portable computer. The evolution of these mobile devices has been fueled by the demand for immediate access to information and has been assisted by the convergence of computing and communications technologies.

The services for the mobile devices provided by service providers (e.g., wireless network operators (carriers) working with applications developers) are based on the production and dissemination of data, including voice and messages, over wireless communication networks. Providers offer multiple services through the mobile devices, including timed delivery of previously subscribed-to information, user accessible customer care (customer service), and customized group communications.

However, there are also other types of application programs that wireless device users may desire to have access to in their efforts to obtain and manage the information available from the Internet and other sources. These applications include both system-oriented applications (electronic mail, account management features, configuration of available features, etc.) and applications that enable a specific type or form of information to be accessed and processed. Other desirable applications include those that enable some form of electronic commerce to be carried out over a wireless network (direction finding, banking, credit checking, real estate searches, location of and purchases of goods, etc.). Thus, it is desirable for wireless carriers to have a means for providing their subscribers with access to such services and applications, especially those that are specifically directed to and tailored for users of mobile devices.

One method of enabling a user to have access to a multitude of services and applications is through what is termed a "web portal", i.e. an Internet web-site or pages that presents a user with a set of links to pages for services or applications. The links may be grouped or organized according to topic, function, or type of service offered. In this respect, the web-site or portal provides a collection of applications which offers the benefits of a centralized and highly integrated Internet site designed to serve the user's needs. The web-site or portal operator (the entity that manages and controls the set of links made available at the site) is able to generate revenue by selling advertising space on the site home page. These features make portal operation a potentially lucrative form of business, as well as a method of establishing and/or maintaining brand strength.

However, in order to function as a portal operator, a company requires access to financial and employee resources, and to content and applications for linking to the portal site. Typically, at least some of the content or applications will be developed internally, while others will be obtained by paying fees to the source(s) of the content or applications. Furthermore, the employee or human capital required is of a specialized nature, in that it must be familiar with the Internet environment, relevant cycle times, advertising, marketing, sales, and customer service requirements, and the prevailing business environment. These requirements are difficult to satisfy for Internet based companies, and even more so for businesses which are not used to operating in such an environment.

The enormous financial rewards that can be obtained by operating an Internet portal make such a venture an attractive option for many companies. Such companies desire to participate in the Internet economy, but may prefer not, or be unable to make the up front investments needed to set up and operate their own portal. At the same time, these companies do not want to see their customers being drawn to a portal that offers services or applications that compete with their own. These companies desire to establish an Internet presence that can be a source of revenue, a platform for launching additional services or features, and a method of reinforcing their brand strength.

On the other hand, a company capable of setting up and operating a portal may not have the financial resources required to engage in the advertising, marketing, and sales activities needed to attract enough customers to the portal to make it a reliable source of revenue. This process of acquiring and retaining users is an important aspect of the success of any Internet based business and typically requires a set of skills different from those involved in developing Internet sites. In addition, building up a customer base typically requires a substantial amount of time, a situation that may not be compatible with the relatively fast time cycles involved in the Internet economy.

What is desired is a method for generating revenue from users accessing an Internet web portal or site, without requiring the up front capital and time commitments typically required to establish and operate a portal.

It is also desired to have a method for enabling a wireless network operator (i.e., a wireless carrier) to reinforce brand strength by operating an Internet web portal for the carrier's subscribers, with the portal providing access to services and applications tailored to users of wireless communications devices. Such a portal may be used to reduce the churn rate of a carrier's subscribers as they seek access to new services and applications, and to attract new subscribers to the carrier's services.

It is also desired to have a method for generating revenue from customers accessing an Internet web portal and utilizing a wireless network to use services and applications linked to that portal, without having to make the typical investments to acquire subscribers to the wireless carrier whose brand is associated with the portal.

SUMMARY OF THE INVENTION

The present invention is directed to a business model and method for generating and/or distributing Telecom and Internet revenue between a wireless network operator and an Internet Partner company. The inventive business model includes an Internet web-site for the carrier's subscribers, with the web-site being developed and operated by the Internet partner. The web-site features applications and services directed to users of mobile wireless communications devices. The services and applications are optimized for such users in terms of the information that is made available, the data processing methods, and the user interfaces. The services and applications are intended to result in increased use of the wireless network. The inventive model may include a portal or web-site for each of one or more carriers, where the portals are branded for the respective companies and accessible by the subscribers of the respective companies.

The invention provides incentives to increase network usage and conduct transactions that generate value and revenue for both the wireless network operator and the Internet Partner. Incentives exist for subscribers of the network operator to utilize the network and participate in transactions because they are provided with access to a desirable set of services and applications that are developed and optimized for users of wireless devices. The model also provides incentives for "downstream" companies to enter into relationships with the Internet Partner to permit customers of those companies to have access to the services and applications that are made available on the web-site, since such companies can share in the revenue generated from that access. Thus, the inventive model provides benefits for the network operator, the subscribers to that network, the Internet Partner, and to the downstream companies.

The revenue generated by the inventive business model may be generally classified as either Telecom or Internet derived revenue. These revenue streams result from the creation of both Telecom and Internet Value from the users of the web-site, with that value being translated into revenue that is shared between the wireless network operator(s) and the Internet Partner company (and also the downstream companies, if such are present). The wireless network provides a group of users that use the network to access a branded or co-branded web-site that contains services and applications tailored to users of such devices. The web-site is provided by the Internet partner and generates network-derived revenue (or supports existing levels of use) when users utilize the network to access the services or applications. The web-site thus provides Telecom Value to the wireless carrier because it encourages subscribers to maintain and hopefully increase their usage of the network. A payment for this value, or a portion of the web-site generated Telecom revenue may be provided to the Internet Partner since they provided an incentive for the subscribers to increase their use of the network. Customers of the downstream companies having access to the web-site will also increase use of the network by using the services and applications available at the site.

The services and applications available through the web-site generate Internet Value for the Internet Partner, in the form of advertising revenue, sponsor revenue, placement fees, fees from transactions ("e-commerce") engaged in by the users, or some combination of such fees. A portion of this web-site generated Internet Value may be provided to the wireless carrier since they have provided the customer base responsible for generating the Internet Value. Internet Value generated by customers of the downstream companies may be distributed between the Internet Partner and those companies in some form of revenue sharing.

The Internet Partner provided web-site enables a wireless carrier to offer its subscribers specially tailored services and applications without some or all of the up front capital costs associated with developing those services and applications, or of establishing a portal. This is accomplished in a manner that maintains the brand strength of the carrier. The portal or web-site may also be co-branded to establish brand recognition for the Internet Partner.

One benefit of the inventive model is that the Internet Partner is able to establish a branded or co-branded web-site for multiple carriers, and thus receive revenue derived from a plurality of customer groups without the need to expend resources on acquiring and retaining those customers. As a consequence of providing access to an aggregation of groups of customers or subscribers, advertising revenues for services or applications common to multiple web-sites can be higher than for advertisements targeted at smaller customer groups. In addition, since the services and applications are tailored to the category of users accessing the web-site(s), the advertising rates may be higher as a result of the availability of a targeted audience. This situation places the Internet Partner in a position to provide access to services and applications for a large number of potential customers and generate revenue from companies willing to pay a fee for that access. The Internet Partner is also able to benefit by serving as a gateway for the customers of the downstream companies desiring access to the wireless device directed services and applications.

From the perspective of the wireless carriers whose brand is on the web-sites or portals, the inventive model provides entry into the Internet economy without some or all of the normally associated costs. It also provides the carriers with a means of reducing customer churn rates and a platform for offering services related to the carrier's core business. The web-site and its associated services and applications can be used to acquire new customers for the carrier whose brand is on the portal. As noted, the services and applications accessible through the web-site will also increase the subscriber's use of the carrier's wireless network, and in some cases will be responsible for generating additional carrier revenue.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without some of these specific details. In other instances, well known methods, procedures, components, and circuitry have not been described in detail to avoid unnecessarily obscuring aspects of the present invention.

The detailed descriptions of the present invention in the following are sometimes presented in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art.

The present invention is a business model and method for generating and/or distributing Telecom and Internet derived revenue by providing access to a set of services and applications tailored for users of wireless mobile communications devices (e.g., the subscribers of a plurality of wireless network operators). The model and method described in detail below are a self-consistent sequence of processes or steps leading to a desired result. These steps or processes may require physical manipulations of physical quantities. Usually, though not necessarily, these quantities may take the form of electrical signals capable of being stored, transferred, combined, compared, displayed and otherwise manipulated in a computer system or electronic computing devices.

It proves convenient at times, principally for reasons of common usage, to refer to these signals as bits, values, elements, symbols, operations, messages, terms, numbers, or the like. It should be borne in mind that all of these terms are to be associated with the appropriate physical quantities and are merely convenient labels applied to these quantities. Unless specifically stated otherwise, as apparent from the following description, it is appreciated that throughout the present invention, discussions utilizing terms such as "processing" or "sending" or "verifying" or "displaying" or the like, refer to the actions and processes of a computing device. The computing device manipulates and transforms data represented as physical quantities within the computing device's registers and memories into other data similarly represented as physical quantities within the computing device or other electronic devices.

The Preferred Embodiment

Figure 1:
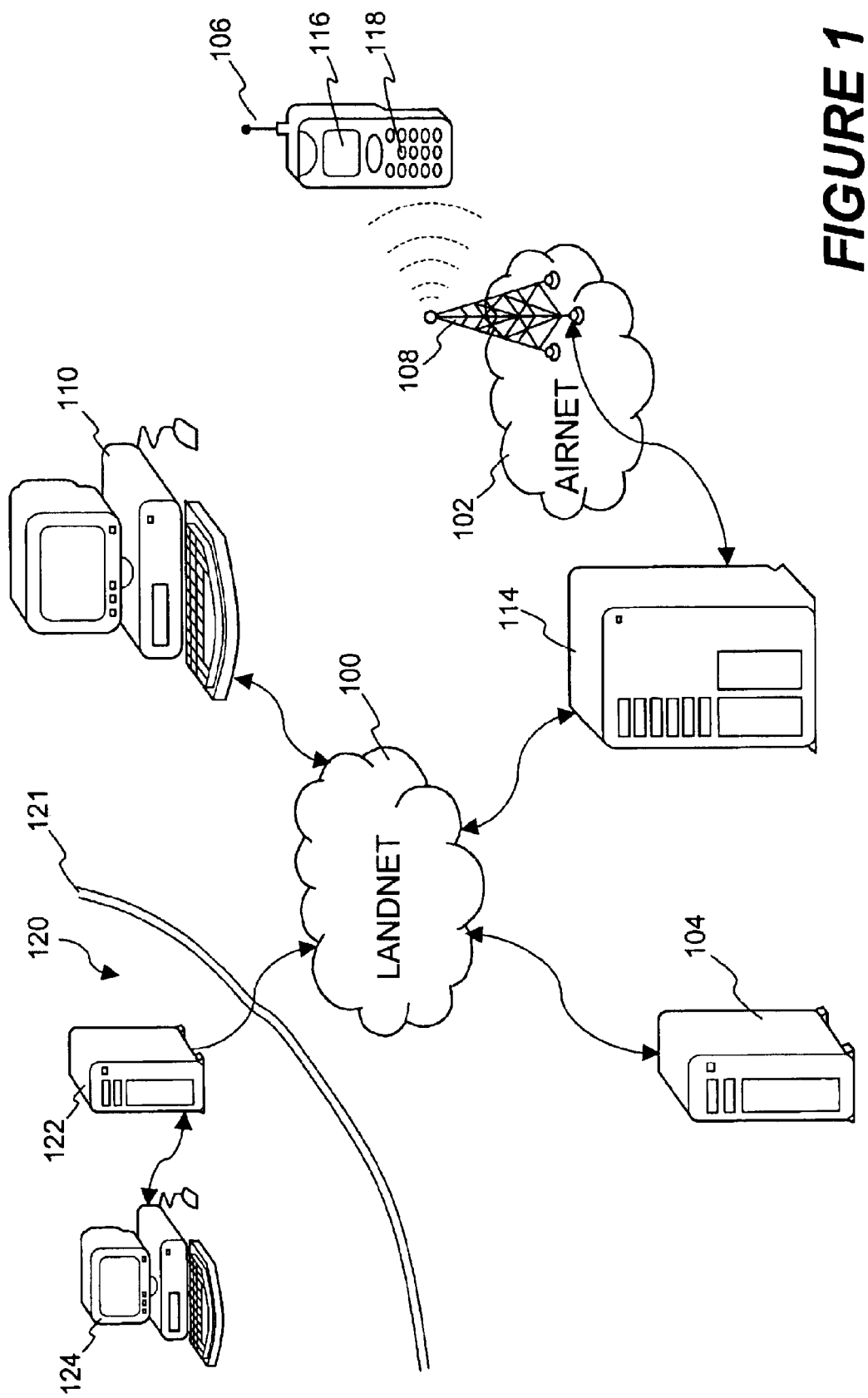
FIG. 1 shows a schematic representation of a data network architecture in which the inventive business model and method may be implemented.

Referring now to the drawings, in which like numerals refer to like parts throughout the several views. FIG. 1 shows a schematic representation of a data network architecture in which the inventive business model and method may be implemented. Landnet 100 is a landline network that may be the Internet, the Intranet, or a data network formed from other private networks. Coupled to landnet 100 are a personal computer (PC) 110 and a network server 104. Personal computer 110 may, for example, be a Pentium II-based desktop personal computer. Preferably, personal computer 110 runs a HyperText Markup Language (HTML) browser, such as Netscape Navigator from Netscape Communications Corporation, via landnet 100 using HyperText Transfer Protocol (HTTP) to access information stored in network server 104. Network server 104 may be a workstation from SUN Microsystems Inc. The information stored in network server 104 may be hypermedia, such as mark-up language based pages.

Also shown in FIG. 1 is a private network 120 including a computer 124 and a server 122. Private network 120 is protected by a firewall 121 protecting resources of the private network from users on other networks. Private network 120 is typically used in a corporate configuration in which secure information is kept in server 122 and is accessible only by computing devices, such as computer 124, on private network 120.

Serviced by airnet 102 are a number of two-way wireless interactive communication devices, referred to as mobile stations herein. One such device is represented by element 106 in FIG. 1. Mobile station 106 is one of a group of two-way interactive communication devices that include, but are not limited to, cellular phones, palm-sized personal assistant devices, and Internet-capable appliance controllers, and are capable of communicating wirelessly with antenna 108 via airnet 102. For simplicity, antenna 108 also represents a wireless carrier (wireless network operator) infrastructure that generally comprises a base station and an operations and maintenance center. The base station controls radio or telecommunication links with the mobile stations. The operations and maintenance center typically includes a mobile switching center that performs switching of calls between the mobile stations and other fixed or mobile network users. The operations and maintenance center manages mobile account services, such as authentication, and oversees the proper operation and setup of the wireless network. Each of the hardware components and processes in carrier infrastructure 108 are known to those skilled in the art and are not described herein to avoid unnecessarily obscuring aspects of the present invention.

Between landnet 100 and airnet 102 is positioned a server device 114 functioning as a bridge between the landnet and airnet, and which is generally referred to as a proxy server. It may also be referred to as a link server, a network gateway server, or a wireless data server. Proxy server 114 may be a workstation or a personal computer. Generally, the communication protocol in airnet 102 is different from that in landnet 100. Hence, one of the functions proxy server 114 performs is to map or translate one communication protocol to another. Proxy server 114 may also be responsible for translating content expressed in one markup language to a second markup language that is better suited for use with the mobile devices. As a result of the operations of proxy server 114, a mobile station 106 coupled to airnet 102 can communicate and share data with any of the devices coupled to landnet 100.

According to one embodiment, the communication protocol in the Internet 104 is the HyperText Transfer Protocol (HTTP) or HTTPS, a secure version of HTTP, that runs on TCP (Transmission Control Protocol). The protocol controls the connection of the HTML web browser in, for example, PC 110 to server 104, and the exchange of information between them. The communication protocol between mobile station 106 and proxy server 114 via airnet. 102 may be Handheld Device Transport Protocol (HDTP) (formerly known as Secure Uplink Gateway Protocol (SUGP)), which preferably runs on User Datagram Protocol (UDP). This protocol controls the connection of an HDML web browser in mobile station 106 to proxy server 114 (HDML stands for Handheld Device Markup Language and has been referred to as "TIL" (terminal interaction language)). HDML is a tag-based document markup language and comprises a set of commands or statements specified in a card that provides instructions for how information is to be displayed on a screen 116 of the mobile station 106. Normally a number of cards are grouped into a deck that is the unit of HDML information exchanged between the mobile station 106 and proxy server 114. Further details regarding the protocols and markup languages that may be used to practice the invention may be found in U.S. Pat. No. 5,809,415, entitled "Method and Architecture for an Interactive Two-Way Data Communication Network", issued Sep. 15, 1998 and assigned to the assignee of the present invention, the contents of which are hereby incorporated by reference.

HDTP is a session-level protocol that resembles HTTP but does not incur the overhead of HTTP, and is optimized for use in "thin" devices, such as the mobile stations, that have less computing power and memory than that of a desktop or portable personal computer. It should be understood by those skilled in the art that UDP does not require a connection to be established between a client and a server before information can be exchanged. This eliminates the need of exchanging a large number of packets during session creation between a client and a server. Exchanging only a small number of packets during a transaction to enable effective interaction with a landline device is one of the desired features of a mobile device having limited computing power and memory.

It should be noted that although the preceding discussion has been directed to a specific architecture in which the present invention may be practiced, such practice is not limited to that architecture. In particular, practice of the present invention is not limited to use with the coupled wired/wireless network shown or the particular communications protocols or markup languages cited. The invention may be practiced in any architecture within the general context of Internet sites, web-sites, and portals, as those terms would be understood by one of ordinary skill in the art. The architecture of FIG. 1 simply provides an example of a system in which the inventive business model may be implemented.

Figure 2:
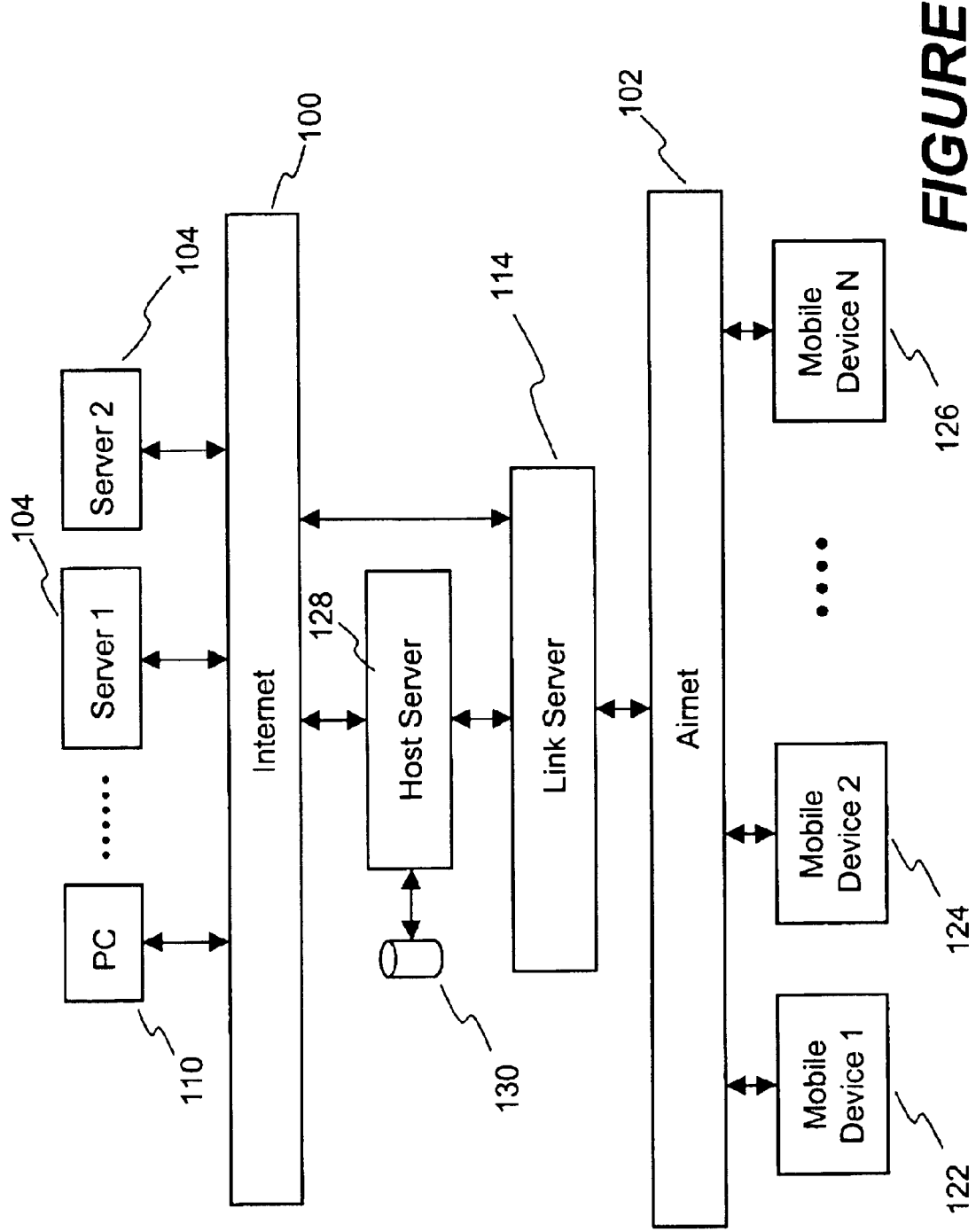
FIG. 2 is a block diagram of the architecture of FIG. 1.

FIG. 2 is a block diagram of the architecture of FIG. 1. As described above, airnet 102 communicates simultaneously with a plurality of two-way wireless mobile communication devices, 122, 124 and 126, generally selected from a group consisting of mobile phones, two-way pagers and telephones. Due to efforts directed toward reducing the size and weight of such devices, most of the mobile devices (which may be considered as "thin clients") have a limited computing power compared to a desktop, laptop, or other type of portable computing device. In addition, the display size and graphics capabilities of the mobile devices are limited, and the user interface is typically a keypad having smaller and fewer keys than a desktop computer's keyboard.

As a result of these limitations, many transactions desired to be carried out by users through such clients are preferably predetermined or previously configured in a user account resident in a host server 128. Host server 128 is typically resident at and under the control of a wireless carrier that operates airnet 102. The user account permits the users to access desired services or perform transactions by activating a small number of keys on the keypads of the mobile devices. For example, given a list of stock symbols of interest stored in a user account associated with a mobile phone, a user of the mobile phone is not required to enter the symbols every time she desires to look up the price of one of those stocks. Instead, the list of stock symbols is previously entered and associated with the user account. This permits retrieval or updating of the stock data by entry of a small number of keystrokes.

A convenient method for entering such data and associating it with the mobile device user's account is by using a computing device that has enhanced information entering capabilities compared with the mobile device. A desktop or portable PC is a typical example of such a computing device, where the PC may be equipped with a well-known HTML browser that provides a comparatively rich graphic user interface and a desirable environment in which a user can manage the personalized information in their account.

In this regard, the architecture of FIGS. 1 and 2 provides access to a common data file or account from both a desktop and mobile device. This permits a user to establish an account, configure, or re-configure a common data file or application from a device best suited for that purpose, and then access that data file or application from a different device best suited for the present needs of the user. This also permits data to be transferred between the two devices for use at the time and location desired by the user. For example, data entered on the keypad of the mobile device can be accessed and processed by the desktop device, permitting updating of data used by applications executed on the desktop device based on inputs from the mobile device. Similarly, data entered on the keypad of the desktop device can be accessed and processed by the mobile device, permitting updating of data used by applications executed on the mobile device based on inputs from the desktop device.

As is known, the Internet may be represented as a network of networks connecting computers that are provided with a HTML browser. Referenced by 110 is a PC representing one of the computers that use the HTML browser running on HTTP to hyperlink to other computers/servers 104 to update/fetch information on line or copy files. It is generally understood that a database or an allocation of memory, as referenced by 130 in the figure, hosts a plurality of user accounts, in each of which managed or personalized information is stored. Database 130 can be an independent storage location or a part of the host server 128.

A One method of accessing the personalized information is for a user to provide an account entry (sometimes termed a "rendezvous") to a user account in host server 128 or database 130. The account entry typically includes a set of credential information, e.g., a username and a password. Each mobile phone is assigned a device ID, where the ID can be the phone number of the phone or a combination of an IP address and a port number, for example: 204.163.165.132:01905, where 204.163.165.132 is the IP address and 01905 is the port number. The device ID is further associated with a subscriber number (sub #) authorized by a wireless carrier as part of the procedures used to activate the mobile device. Each of the mobile devices 122, 124 and 126 has a unique device ID that corresponds to a respective user account in a server. It will be appreciated by those skilled in the art that link server 114 does not have to be a separate sever to perform the communication protocol mapping and other data processing tasks involved in establishing and maintaining communication between a PC (for example) and a mobile device. Link server 114 can be a part of the host server 128, in which case the protocol mapping and/or other processing functions are provided by the host server 128.

The wireless carrier or network operator that operates airnet 102 may desire to operate a portal for its subscribers. The motivations for such an endeavor may be to establish a presence on the Internet, maintain brand strength, or provide those customers with access to a group of services and applications developed and optimized for users of mobile wireless devices. However, since such a venture is time consuming and expensive to implement, the carriers may not have, or desire to allocate, the resources to set up and operate a web portal in a timely fashion. Other types of business entities desiring to operate a portal or web-site to provide services to their customers and that are faced with similar constraints may also benefit from the present invention. In addition, companies other than wireless carriers (referred to as "downstream" companies in the description of the invention) may desire to provide their customers with access to a set of services and applications developed for mobile wireless devices.

Figure 3:
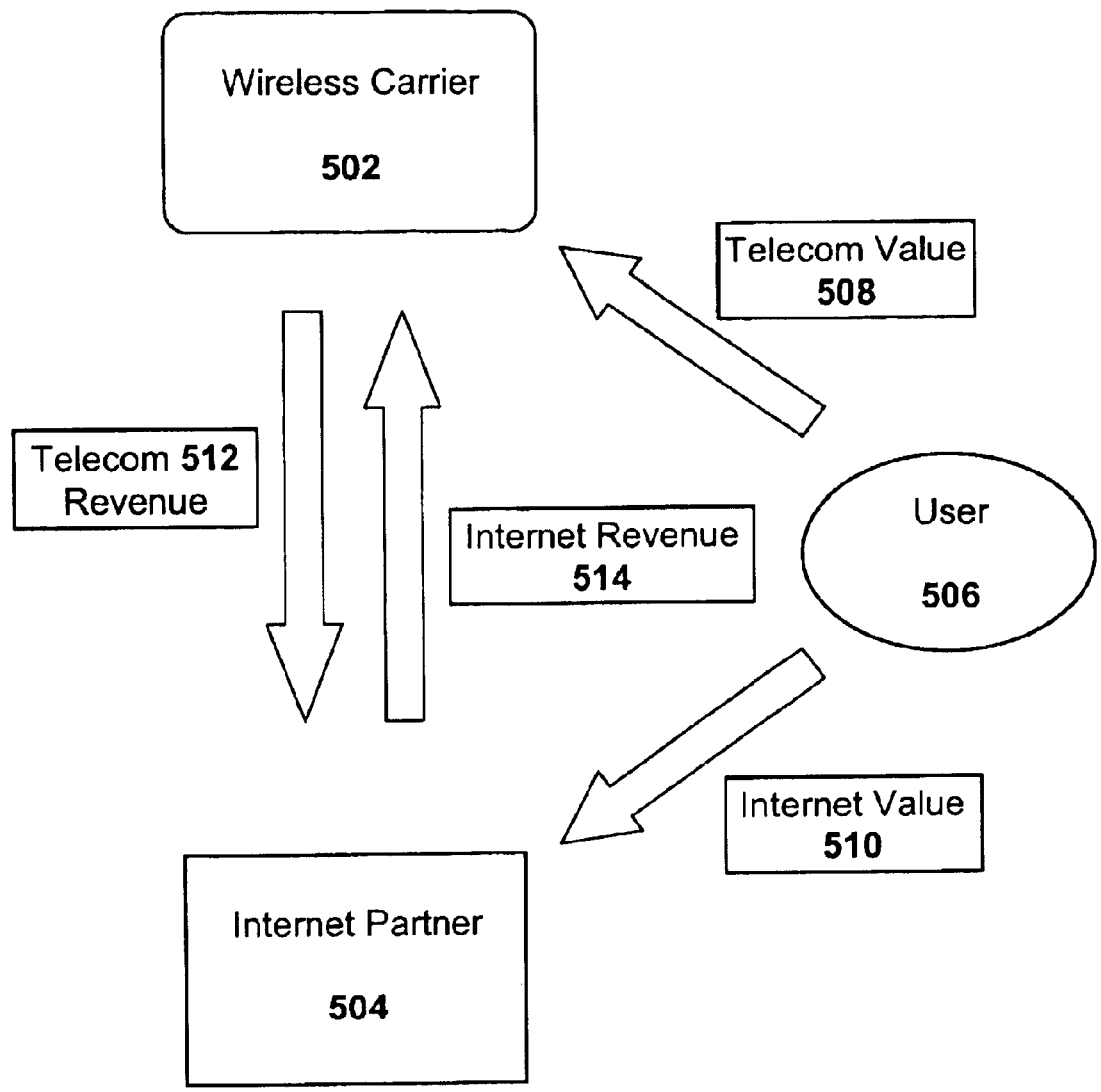
FIG. 3 is a diagram showing the Telecom and Internet value and respective revenue flows created by the inventive business model and method.

The inventive business model provides a solution to these problems. FIG. 3 is a diagram showing the Telecom and Internet Value(s), and respective revenue flows created by the inventive business model and method. In the figure, Wireless Carrier 502 is the operator of a wireless network providing communication services to a Carrier Subscriber 506. Carrier 502 partners with Internet Partner 504 to provide specially tailored services and applications to mobile device users (Subscribers 506) through a web-site or portal. This process generates Telecom Value 508 and Internet Value 510. The value generated produces associated revenue flows (shown as elements 512 and 514 in the figure).

Internet Partner 504 produces and operates a portal or web-site for the Subscribers 506 of Wireless Carrier 502. The portal or web-site is "branded" with the trademarks, service marks, or other identifying symbols or features of Carrier 502 so that the subscribers of that carrier's services will associate the portal with the Carrier. The portal or web-site may also be "co-branded" with the trademarks, service marks, or other identifying symbols or features of both Carrier 502 and Internet Partner 504.

Note that Internet Partner 504 may have such web-site development and operation relationships with a plurality of Carriers, each having a respective subscriber group. All such groups are enabled to have access to a set of services and applications tailored to users of mobile devices through the Carrier branded portals. Typically, Internet Partner 504 will provide a differently branded portal or web-site for each Carrier, with each such portal or web-site having the branding and other user interface elements desired by that Carrier, as well as a set of services and applications specified by that Carrier. Thus, each such portal or web-site will have the "look and feel" of a site especially tailored for the subscriber group of the respective Carrier.

The portal or web-site can provide access to both horizontally integrated services or applications (e.g., E-mail or Account Management) and vertically integrated services or applications (e.g., Location Based, Presence Based, or Specialized/Transaction Based (sometimes referred to as "e-commerce" applications)). Some or all of these services or applications may be provided by Internet Partner 504, with others provided by Carrier 502, or by third party companies that pay a fee to Internet Partner 504 for placement of a link to their service or application on the web-site. Note that the portal or web-site may also provide access to other, vertically integrated portals or web-sites that in turn provide additional services or applications to users.

Further, as mentioned, the portal or web-site may be made accessible to the Customers 522 of other companies (referred to as "Downstream Company 520" in the figure) in addition to the subscribers of the carriers. This makes the wireless device oriented services and applications accessible through the portal available to an expanded set of users of wireless devices. Such access will generate an Internet Value and associated Internet derived Revenue (e.g., placement fees for visibility on web-site, transaction based fees, other forms of revenue sharing; shown as element 524 in the figure) for Internet Partner 504 and Company 520. Note that Company 520 may operate its own web-site or portal for its customers, as well as provide applications developed for those customers.

With regards to the examples given, location based applications include applications that permit a user to obtain specific information (weather, restaurants, movies, etc.) based on their location at the time of making a request for such information, or for a location they provide as an input. An architecture for such applications is described in the co-assigned Provisional U.S. patent application Ser. No. 60/145,439, entitled. "Location Architecture for a Wireless Communications System", filed Jul. 23, 1999, and the contents of which are hereby incorporated by reference.

Presence based applications include applications that permit a user to determine if a friend or associate is available for communication. An architecture for such applications is described in the co-assigned U.S. patent application Ser. No. 09/359,846, entitled "Message and Status Indication for Wireless Communication Devices", filed Jul. 23, 1999, and the contents of which are hereby incorporated by reference. Transaction based applications include those that permit a user to engage in a type of electronic commerce (banking, a real estate transaction, purchase of a product, etc.), where such applications and their associated user interfaces are optimized for mobile devices.

The Telecom and Internet Value and subsequent revenues generated by the portal or web-site may result from several sources. Firstly, the Internet Partner providing and operating the portal may receive revenue from the Telecom Value derived from a Carrier's subscribers that access the portal. This revenue may consist of a flat fee, a fee per user or user group that accesses the portal, a percentage of the additional Telecom revenue generated by subscribers utilizing the Carrier's network to access the portal and its related services and applications, or another agreed upon basis. The additional Telecom revenues resulting from use of the web-site or portal and the increased network traffic produced are shared between the Carrier and the Internet partner. Note that in some situations, the network usage may increase without an increase in carrier revenue. In such cases, Telecom Revenue 512 may be in the form of a payment to Internet Partner 504, in return for which Carrier 502 is able to obtain non-monetary benefits in the form of increased retention of subscribers, etc.

The Internet Partner will also receive revenue from the Internet value created by the web-site. This is a result of offering the subscribers access to services and applications through the web-site. This revenue may be in the form of a user or transaction fee for those users who access the services or applications available through the portal. Such a fee may be calculated based on the value of the transaction, the type of transaction, or another suitable measure. Another source of such revenue may be a payment made by the companies that benefit from use of those services or applications in return for bringing potential customers to their services. The Internet Partner may also receive revenue from fees assessed for additional products or services the Partner may supply. For example, if the Internet Partner provides added value features for customers of a wireless Carrier (provisioning a phone with specific features, etc.), then a fee for that service may be generated for the Internet Partner.

Similarly, advertising revenues for advertisements placed on the web-site or portal can generate revenue for the Internet Partner. Advertising revenues may also be generated from companies desiring to place advertisements on the display screens of the mobile devices. In a similar manner, the companies whose brands appear on the web-sites or portals may provide advertising revenue for the Internet Partner by placing ads on the portal to attract users of the portal to the services those companies can offer. The Internet Partner may also receive revenue (placement fees) by acting as a broker for businesses that wish to place a link to a mobile device oriented service or application on the web-site. The Internet Partner may also obtain revenue by providing an "incubation" site for service or application providers wishing to encourage visitors to the Partner operated web-site to utilize other, related sites, services, or applications.

One advantage of the inventive business model and method is that the Internet Partner is able to receive revenue from a plurality of customer groups without the need to expend resources on acquiring and retaining those customers (as these functions are performed by the Carriers). By providing access to an aggregation of groups of customers or subscribers through one or more branded web-sites, placement, broker or other forms of access fees, and advertising rates and revenue for the Internet Partner can be higher than for the situation of providing access to and advertisements for a single customer group. In addition, advertising rates may be higher than in other circumstances because the advertisements are directed to a targeted user group, i.e., users of wireless communications devices. This situation places the Internet Partner in a position to leverage their ability to offer access to a large number of already recruited potential customers and generate revenue from companies willing to pay a fee for that access. An example would be vertically integrated portals desiring to attract the visitors to the multiple web-sites or portals to their own portals.

From the perspective of the companies whose brands are on the web-sites or portals, the inventive model and method provides entry into the Internet economy without some or all of the normally associated costs. In the case of wireless network operators, it provides the Carriers with a means of reducing customer churn rates and a platform for offering services related to the Carrier's core business. The web-site and its associated services and applications can thus be used to acquire new customers for the company whose brand (or co-brand) is on the web-site.

As mentioned, many of the services and applications accessible through the web-site or portal will also increase the subscribers' use of the Carrier's wireless network, generating additional Telecom Value and Carrier revenue. Increased Telecom Value is also generated because of the reduced churn rate of the subscribers (a reduced rate of customers switching carriers and hence a reduction in the associated recruiting and related costs). This benefit arises from customer investment in customizing the services and preferences of the web-site. Increased Telecom Value also arises because of a lower cost of attracting new subscribers (because of new services and applications available through the Carrier's web-site). This increased Telecom based revenue is shared between the Carrier and the Internet Partner responsible for establishing and operating the branded web-sites (since the Internet Partner is responsible for increasing the use of the wireless network).

The subscribers' use of the services and applications will in turn generate Internet Value and associated revenues in the form of advertising revenues, broker fees for links placed on the web-site, transaction fees, and other forms of revenue sharing. This revenue stream is also shared between the Carrier and the Internet Partner responsible for establishing and operating the branded web-sites (since the Carrier is responsible for attracting and retaining the customers who utilize the web-site to generate the Internet value). Note that if the Internet Value generated is of sufficient magnitude, then it may become equal to or greater than the payment made to the Internet Partner for the increase in Telecom Value. This would enable the Carrier to obtain the benefits of having the branded web-site at no net cost, or at a net profit.

The relationship between Internet Partner 504 and Downstream Company 520 generates Internet Value and associated Revenue 524 because of the services and applications provided to Customers 522. This can be in the form of payments or fees paid to Partner 504 by Company 520 to permit customer access to the web-site and some form of revenue sharing between them of the revenue arising from transactions engaged in or services utilized by the customers.

Figure 4:
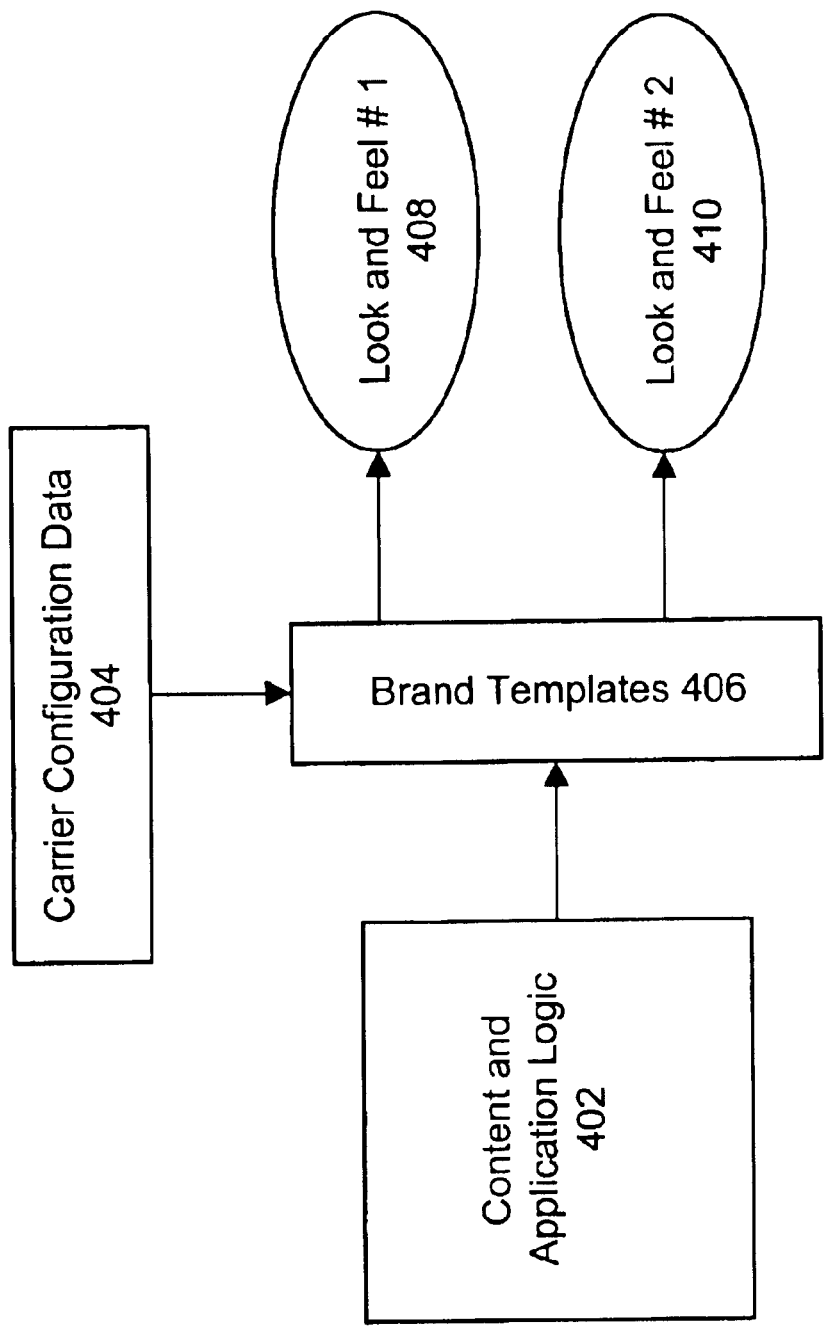
FIG. 4 is a diagram showing how templates may be used to provide a plurality of differently branded portals or web-sites for different carriers, based on a common set of content and applications.

FIG. 4 is a diagram showing how templates may be used to provide a plurality of differently branded portals or web-sites for different Carriers derived from a common set of content and applications. As shown in the figure, the content and application logic 402 for a set of services or applications is presented in the form of a Carrier branded web-site through the use of a Brand Template 406. The Brand Template 406 determines the position, color, and other user interface attributes for the web-site based on Carrier Configuration Data 404 specific to that carrier. This means that each Carrier can have a web-site that exhibits the "look and feel" it desires for its subscribers, including such attributes as the location, size, color, and relationship of different elements on the web-site. The Internet Partner can generate and operate a plurality of such web-sites, each having a "look and feel" desired by the respective Carriers (shown as elements 408 and 410 in the figure).

Note that in accordance with the present invention, the branded web-site(s) can be accessed from both the mobile device and from a desktop or other computing device. This permits a user to modify their preferences and configure services or applications using the desktop device, and then utilize those preferences, services, and applications from the mobile device. It also permits users to obtain the most efficient use of each platform by configuring those aspects of the services or applications from each platform that are best understood or utilized from that platform. Thus, it is not necessary that the same functionality be available or used on both platforms. For example, when using a travel application, the desktop or PC platform may be used to make reservations, whereas the mobile device platform may be used to rebook flights already reserved in case of a delay or some other change in plans.

The Internet Partner may also obtain revenue by tracking and compiling data relating to user traffic on the Internet (e.g., types of services or applications utilized, amount of money spent in transactions, etc.) and provide this data to the respective Carrier for that user. This permits the Carrier to more efficiently develop services and applications for its subscribers and configure the branded web-site or portal in a manner that maximizes the user's use of the network. This feedback can serve to increase the Telecom Value of the web-site. Such data can also be sold to advertisers seeking to target potential service users or buyers having a specified profile.

The present invention provides a business model and method that permits a company to establish a presence on the Internet and provide its customers with access to a variety of services and applications beyond those provided directly by the company. The present invention permits this to be accomplished without the necessity of some or all of the investments normally required. An intermediary, termed an Internet Partner, provides the company's customers with access to a set of services and applications tailored for users of mobile communications devices. This is done in the form of a branded web-site, with the Internet Partner obtaining revenue from access, transaction based, advertising, and other fees. The Internet Partner may establish and operate such a web-site or portal for a plurality of Carriers or other companies.

The branded web-site provides services and applications for the subscribers of a wireless Carrier that are designed to increase the Telecom based revenues of the Carrier and generate access, transaction based, and other Internet revenues for the Internet Partner. These revenue flows are shared between the Carrier and Internet Partner. The Carrier has incentives to attract subscribers and encourage their use of the web-site since that will increase use of the Carrier's network. The Internet Partner has incentives to develop and maintain a desirable set of services and applications for the Carrier's subscribers since that increases the Internet based revenue for the Internet Partner.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the description of the embodiments.

What is claimed is:

1. A method of generating revenue for and distributing revenue between a wireless network operator and an Internet Partner, comprising:

providing a set of services and applications for use by subscribers of the wireless network operator, wherein at least some of the services and applications are provided by the Internet Partner and result in use of the wireless network when accessed by the subscribers, and also result in generation of revenue from use of the services and applications;

distributing at least some of the revenue generated by the subscribers' use of the wireless network when accessing the services and applications to the Internet Partner; and distributing at least some of the revenue generated from the subscribers' use of the services and applications to the wireless network operator.

2. The method of claim 1, wherein the providing a set of services and applications further comprises:

providing a web-site containing links to a plurality of services and applications for use by the subscribers.

3. The method of claim 2, wherein the web-site is branded with the brand characteristics of the wireless network operator.

4. The method of claim 2, wherein the web-site is branded with the brand characteristics of the Internet Partner.

5. The method of claim 1, wherein the providing a set of services and applications further comprises:

providing a set of services and applications that may be accessed from a subscriber's wireless communication device and from a computing device.

6. The method of claim 5, wherein the computing device is a personal computer (PC).

7. The method of claim 1, further comprising:

providing access to the set of services and applications for customers of a downstream company, wherein the customers' use of the services and applications generates revenue that is distributed between the Internet Partner and the downstream company.

8. A method of generating revenue, comprising:

providing a set of services and applications for use by subscribers of a wireless network operator, wherein at least some of the services and applications result in use of the wireless network when accessed by the subscribers and also result in generation of revenue from use of the services and applications;

receiving at least some of the revenue generated by the subscribers' use of the wireless network when accessing the services and applications; and distributing at least some of the revenue generated from the subscribers' use of the services and applications to the wireless network operator.

9. The method of claim 8, wherein the providing a set of services and applications further comprises:

providing a web-site containing links to a plurality of services and applications for use by the subscribers.

10. The method of claim 9, wherein the web-site is branded with the brand characteristics of the wireless network operator.

11. The method of claim 9, wherein the web-site is branded with the brand characteristics of the recipient of the at least some of the revenue generated by the subscribers' use of the wireless network when accessing the services and applications.

12. The method of claim 8, wherein the providing a set of services and applications further comprises:

providing a set of services and applications that may be accessed from both a subscriber's wireless communication device and from a computing device.

13. The method of claim 12, wherein the computing device is a personal computer (PC).

14. The method of claim 8, further comprising:

providing access to the set of services and applications for customers of a downstream company, wherein the customers' use of the services and applications generates revenue that is distributed between the Internet Partner and the downstream company.

15. A system comprising:

a set of services and applications for use by subscribers of a wireless network operator, wherein at least some of the services and applications result in use of the wireless network when accessed by the subscribers, and also result in generation of revenue from use of the services and applications;

a first revenue stream directed toward the wireless network operator, wherein the first revenue stream comprises at least some of the revenue generated from the subscribers' use of the services and applications; and a second revenue stream directed toward a provider of at least some of the set of services and applications, wherein the second revenue stream comprises at least some of the revenue generated by the subscribers' use of the wireless network when accessing the services and applications.

16. The system of claim 15, wherein the set of services and applications further comprises:

services and applications accessed through a web-site containing links to the services and applications.

17. The system of claim 16, wherein the web-site is branded with the brand characteristics of the wireless network operator.

18. The system of claim 16, wherein the web-site is branded with the brand characteristics of the provider of at least some of the set of services and applications.

19. The system of claim 15, wherein the set of services and applications further comprises:

services and applications that may be accessed from both a subscriber's wireless communication device and from a computing device.

20. The system of claim 19, wherein the computing device is a personal computer (PC).

21. The system of claim 15, further comprising:

a third revenue stream directed between a provider of at least some of the set of services and applications and a downstream company having customers that are provided access to the set of services and applications.

22. A method of generating revenue for a wireless network operator, comprising:

arranging for a company to provide a set of services and applications for use by subscribers of the wireless network operator, wherein at least some of the services and applications result in use of the wireless network when accessed by the subscribers, and also result in generation of revenue from use of the services and applications;

distributing at least some of the revenue generated by the subscribers' use of the wireless network when accessing the services and applications to the company providing the set of services and applications; and receiving at least some of the revenue generated from the subscribers' use of the services and applications.

23. The method of claim 22, wherein the set of services and applications further comprises:

services and applications accessed through a web-site containing links to the services and applications.

24. The method of claim 23, wherein the web-site is branded with the brand characteristics of the wireless network operator.

25. The method of claim 23, wherein the web-site is branded with the brand characteristics of the company providing the set of services and applications.

26. The method of claim 22, wherein the set of services and applications further comprises:

services and applications that may be accessed from both a subscriber's wireless communication device and from a computing device.

27. The method of claim 26, wherein the computing device is a personal computer (PC).

28. A method comprising:

providing a set of services and applications for use by subscribers of a wireless network operator, wherein at least some of the services and applications are provided by an Internet Partner and are used by the subscribers via the wireless network, wherein said set of services and applications are branded with brand characteristics of the wireless network operator, and wherein said use of the services and applications by the subscribers results in generation of revenue; and distributing the revenue such that the revenue is shared between the Internet Partner and the wireless network operator.

29. The method of claim 28, wherein the providing a set of services and applications further comprises:

providing a web-site containing links to a plurality of services and applications for use by the subscribers.

30. The method of claim 28, wherein the set of services and applications is also branded with brand characteristics of the Internet Partner.

31. The method of claim 28, wherein the set of services and applications are accessible from a subscriber's wireless communication device and from a computing device.

32. The method of claim 31, wherein the computing device is a personal computer (PC).

33. The method of claim 28, further comprising: providing access to the set of services and applications for customers of a downstream company, wherein the customers' use of the services and applications generates revenue that is distributed between the Internet Partner and the downstream company.

* * * * *